United States Patent [19]

Kuster

[11] 3,994,872

[45] Nov. 30, 1976

[54] TERTIARY-ALKYLAMINE SALTS OF METAL COMPLEX DYESTUFFS

[75] Inventor: Werner Kuster, Basel, Switzerland

[73] Assignee: Ciba-Geigy Corporation, Ardsley, N.Y.

[22] Filed: Feb. 10, 1975

[21] Appl. No.: 548,506

Related U.S. Application Data

[63] Continuation of Ser. No. 277,948, Aug. 4, 1972, abandoned.

[30] Foreign Application Priority Data

Aug. 10, 1971  Switzerland...................... 11730/74
Oct. 11, 1971  Switzerland...................... 14804/71

[52] U.S. Cl.................................. 260/147; 106/22; 260/42; 260/42.21; 260/145 A; 260/145 B; 260/146 R; 260/149; 260/151; 260/186; 260/190; 260/246 B; 260/250 Q; 260/314.5; 260/371; 427/411; 8/42 R

[51] Int. Cl.² .................. C09B 45/06; C09B 45/16; C09B 45/20

[58] Field of Search ........... 260/147, 145 A, 145 B, 260/149, 150, 151

[56] References Cited
UNITED STATES PATENTS

| | | | |
|---|---|---|---|
| 2,315,870 | 4/1943 | Nadler et al. ....................... | 260/208 |
| 2,490,703 | 12/1949 | Paige ................... | 260/187 |
| 2,628,960 | 2/1953 | Freyermuth ...................... | 260/151 |
| 2,814,614 | 11/1957 | Zickendraht.................... | 260/149 X |
| 2,841,576 | 7/1958 | Zickendraht et al. .......... | 260/149 X |
| 3,030,353 | 4/1962 | Kuster................................ | 260/147 |
| 3,051,696 | 8/1962 | Dettwyler .......................... | 260/147 |
| 3,356,671 | 12/1967 | Johnson et al................... | 260/145 R |

FOREIGN PATENTS OR APPLICATIONS

| | | | |
|---|---|---|---|
| 703,456 | 2/1941 | Germany ............................ | 260/151 |
| 743,848 | 11/1943 | Germany ............................ | 260/147 |
| 41-12915 | 7/1966 | Japan.................................. | 260/151 |

*Primary Examiner*—Floyd D. Higel
*Attorney, Agent, or Firm*—Vincent J. Cavalieri

[57] ABSTRACT

New dyestuff salts of the formula

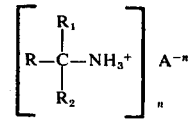

wherein A denotes the radical of an anionic dyestuff, R, $R_1$ and $R_2$ denote alkyl radicals with a total of 10 – 24 carbon atoms and n denotes the number 1 – 4.

The dyestuff salts show excellent solubility in organic solvents such as alcohols, ketones and esters. Due to the excellent solubility in organic solvents, the dyestuffs of the instant invention are especially suitable for dyeing solutions of polymers such as polystyrene or polyamides.

5 Claims, No Drawings

TERTIARY-ALKYLAMINE SALTS OF METAL COMPLEX DYESTUFFS

This is a continuation of application Ser. No. 277,948 filed on Aug. 4, 1972, now abandoned.

It has been found that new dyestuff salts of the formula

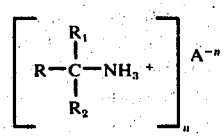

(I)

wherein A denotes the radical of an anionic dyestuff, R, $R_1$ and $R_2$ denote alkyl radicals together possessing 10 to 24 carbon atoms and $n$ denotes the number 1 – 4, are obtained if an anionic dyestuff is reacted with an amine of the formula

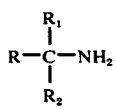

(II)

Examples of anionic dyestuffs which are used are azo, anthraquinone, phthalocyanine, nitro, azine or dioxazine, methine, azomethine, quinacridone or quinophthalone dyestuffs which contain carboxylic acid groups and especially those which contain sulphonic acid groups. 1:2 metal complexes, free of acid groups, of o,o'-dihydroxy-, monoazo- or -azomethine dyestuffs which possess a negative charge are also outstandingly suitable for the reaction according to the invention.

As representatives of azo dyestuffs which contain sulphonic acid groups there may be mentioned the dyestuffs which are obtained by coupling diazotised aminobenzenesulphonic acids, for example aniline-2-sulphonic acid, aniline-3-sulphonic acid, 2-nitroaniline-4-sulphonic acid, 2-chloro-4-nitroaniline-6-sulphonic acid and 2-methoxy-4-nitroaniline-6-sulphonic acid with anilines, for example aniline, m-toluidine, diethylaniline and bis-cyanoethylaniline, phenols or pyrazolones, such as 1-phenyl-3-methyl-5-pyrazolone, 1-phenyl-5-pyrazolone-3-carboxylic acid methyl ester, 1-phenyl-3-methyl-5-pyrazolone-4'-sulphonic acid and 1-phenyl-3-carboxy-pyrazolone-4'-sulphonic acid.

Amongst the series of the anthraquinone dyestuffs containing sulphonic acid groups there may especially be mentioned the 1-amino-4-phenylamino- or -4-cycloalkylamino-2-sulphonic acids, for example 1-amino-4-phenylamino-anthraquinone-2-sulphonic acid, 1-amino-4-p-toluylamino-anthraquinone-2-sulphonic acid, 1-amino-4-(3',4'-dimethylphenylamino)-anthraquinone-2-sulphonic acid or 1-amino-4-cyclohexylamino-anthraquinone-2-sulphonic acid.

Amongst the phthalocyanine series there may be mentioned the copper-phthalocyanine-tetrasulphonic acids, and amongst the dioxazine series there may be mentioned 9,10-dichlorotriphendioxazine-3,7-disulphonic acid, 9,10-dichlorotriphendioxazine-1,5-disulphonic acid, 2,7-dicyclohexylaminotriphendioxazine-1,5-disulphonic acid and the sulphonation product of 2,7-diphenylamine-9,10-dichlorotriphendioxazine.

Amongst the series of the nitro dyestuffs there may be mentioned 2-nitrodiphenylamine-4-sulphonic acid or 2-nitro-diphenylamine-4,3'-disulphonic acid and amongst the series of the quinophthalones there may be mentioned the monosulphonic and disulphonic acids of quinophthalone and of 3'-hydroxyquinophthalone.

Amongst the series of the azine dyestuffs there may especially be mentioned those of which the anion corresponds to the formula

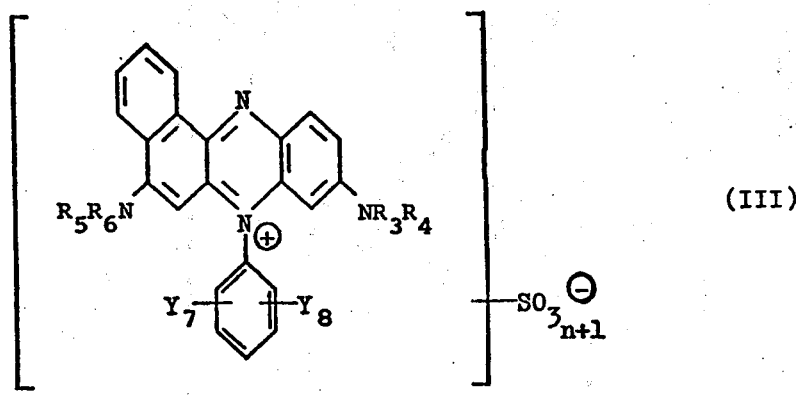

(III)

wherein $R_3$, $R_5$, $Y_7$ and $Y_8$ represent hydrogen atoms or alkyl groups containing 1 to 6 carbon atoms, $R_4$ and $R_6$ represent alkyl groups containing 1 to 6 carbon atoms or phenyl or benzyl groups which are optionally substituted by alkyl, alkoxy or alkylamine groups containing 1 to 6 carbon atoms, and $n$ denotes the number 1 or 2.

As examples of metal complex dyestuffs there may especially be mentioned those of which the anion corresponds to the formula

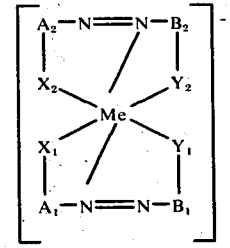

(IV)

wherein $A_1$ and $A_2$ each denote a radical of the benzene series which contains $X_1$ or $X_2$ in the position adjacent to the azo bond, $B_1$ and $B_2$ each denote a radical of the benzene, naphthalene, pyrazolone or acetoacetylarylamide series which contains $Y_1$ or $Y_2$ in the position adjacent to the azo bond, with $X_1$ and $X_2$ denoting —O— or —COO— and $Y_1$ and $Y_2$ each preferably denoting —O— but also denoting

wherein $R_7$ represents hydrogen or an alkyl or aryl radical, and Me denotes chromium or cobalt.

Metal complex dyestuffs of particular interest are those of which the anion corresponds to the formula in which formulae $X_1$ denotes —O— or —COO—, Y denotes a methyl or alkoxycarbonyl group containing 1 to 6 carbon atoms, $Y_5$ denotes a hydrogen or halogen atom or an alkyl or alkoxy group containing 1 to 6 carbon atoms, $Y_6$ denotes a hydrogen atom, a nitro group or an alkylsulphonyl group containing 1 to 6 carbon atoms, $Y_3$ and $Y_4$ denote hydrogen or halogen atoms or alkyl groups containing 1 to 6 carbon atoms and Me denotes chromium or cobalt.

Such metal complexes are obtained, for example, by reacting chromium-donating or cobalt-donating agents with the corresponding metallisable azo dyestuffs in an alkaline medium. Examples of such metallisable azo

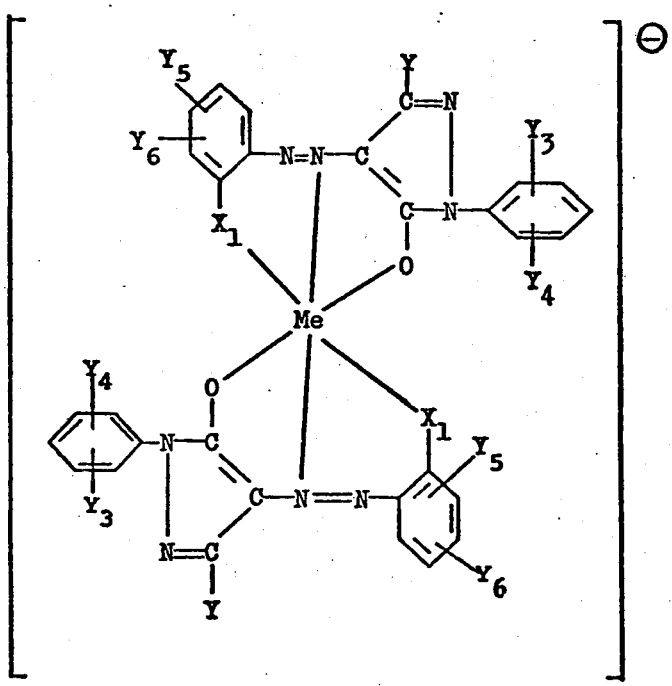

or

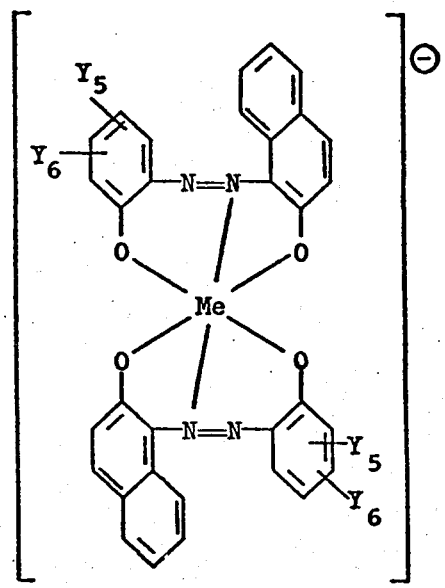

VI dyestuffs are coupling products of the diazo components and coupling components listed below.

Diazo Components

2-Amino-4-alkyl-phenols, 2-amino-4,5-dialkyl-phenols, 2-amino-1,4-dialkoxy-benzenes, 2-amino-4- or -5-halogeno-phenols, 2-amino-4,6-dihalogeno-phenols, 2-amino-4- or -5-alkylsulphonyl-phenols, 2-amino-4- or -5-phenylsulphonyl-phenols, 2-amino-4-alkanoyl-phenols preferably possessing a lower alkanoyl radical, 2-amino-4-benzoyl-phenol, 2-amino-phenol-4-carboxylic acid alkyl esters, 2-amino-phenol-4-carboxylic acid alkylamides, 2-amino-phenol-4- or -5-sulphonic acid amide, 2-amino-phenol-4- or -5-sulphonic acid alkylamides, 2-amino-4- or -5-nitro-phenol, 2-amino-4-alkyl-6-nitro-phenols, 2-amino-4-alkylsulphonyl-5-nitro-phenols, 2-amino-4-cyano-phenol, 2-amino-4-trifluoromethylphenol, 2-amino-1-(bis-alkylsulphonyl-, bis-phenylsulphonyl- or bis-p-alkylphenylsulphonyl-amino)-benzenes (after coupling has taken place, a sulphonyl group is split off), 2-amino-benzoic acid or 2-aminobenzoic acid-4- or -5-sulphonic acid amide or 2-aminobenzoic acid-4- or -5-sulphonic acid alkylamides.

Coupling Components

4-Alkyl-phenols, 2,4- or 3,4-dialkylphenols, 4-cycloalkylphenols, 1-hydroxy-naphthalene-4-sulphonic acid amide or -sulphonic acid alkylamides, 1-hydroxy-naphthalene-3,6-bis-sulphonic acid amide or -3,6-bis-sulphonic acid alkylamides, 2-hydroxy-naphthalenes, for example 2-hydroxy-8-acetylamino-naphthalene, 2-amino-naphthalene, 1-phenyl-3-alkyl-5-hydroxy- or -5-amino-pyrazoles, 1-(halogeno-phenyl-, alkyl-phenyl- or alkylsulphonyl-phenyl)-3-alkyl- or -3-alkoxy-5-hydroxy- or -5-aminopyrazoles, 1-(sulphamoyl-phenyl)- or 1-(N-alkylsulphamoylphenyl)-3-alkyl-5-hydroxy- or -5-amino-pyrazoles, acetoacetyl-phenylamide, acetoacetylhalogenophenylamides, -alkyl-phenylamides or -alkylsulphonylphenylamides or acetoacetyl-(sulphamoyl-phenyl)-amide or acetoacetyl-(N-alkylsulphamoylphenyl)-amides.

("Alkyl" and "alkoxy" here always preferably indicate a carbon number of 1 to 6; "halogen" in particular denotes chlorine or bromine).

Instead of 1:2 metal complexes of azo dyestuffs it is also possible to use complexes of azomethine dyestuffs, for example those which are obtained by condensation of salicylaldehydes or 2-hydroxy-1-naphthaldehydes with o-aminophenols.

Particularly suitable amines for the manufacture of the dyestuff salts according to the invention are the products obtainable under the tradenames Primene 81-R and Primene JM-T of Rohm and Haas Co. These are a mixture of amines which correspond to the formula

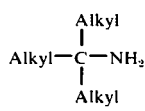

VII with Primene 81-R possessing a total of 12 to 14 carbon atoms and Primene JM-T possessing a total of 18 to 22 carbon atoms.

The salt formation is appropriately carried out by reacting a solution or suspension of an alkali salt of the anionic dyestuff with an aqueous solution of a water-soluble salt of the amine, preferably of a salt with a lower fatty acid, especially of formic acid or acetic acid. The reaction is advantageously carried out at temperatures between 40° and 80° C and at a $p_H$-value below 7.

Since the dyestuff salts are insoluble in an aqueous reaction medium they can be isolated by filtering them off.

The new dyestuff salts show excellent solubility in alcohols, especially in lower alkanols, such as methanol, ethanol, n-propanol or iso-propanol, in alkylene glycol monoalkyl ethers, for example in ethylene glycol monomethyl ether or monoethyl ether, in alkylene glycols, such as in propylene glycols, or in araliphatic alcohols, such as in benzyl alcohol, or in mixtures of such alcohols. In respect of their solubility in alcohol, dyestuff salts according to the invention are superior to previously known dyestuff salts of similar structure. Furthermore, they are soluble in lower aliphatic ketones, for example acetone, methyl ethyl ketone, methyl isobutyl ketone or cyclohexanone, and also in carboxylic acid esters, for example methyl acetate, ethyl acetate, butyl acetate or glycol monoacetate, and in halogenated hydrocarbons, such as chloroform, methylene chloride, ethylene chloride or carbon tetrachloride.

Because of their good solubility in the abovementioned ketones, especially acetone, the dyestuff salts obtainable according to the invention are suitable for the spin-dyeing of cellulose 2½-acetate; because of their good solubility in halogenated lower aliphatic hydrocarbons, especially chloroform, they can also be used for the spin dyeing of cellulose triacetate.

Because of their good solubility in organic solvents, the new dyestuff salts are particularly suitable for dyeing solutions of polymers, such as polystyrene or polyamide, especially alcoholic solutions of film-forming polymers.

By alcoholic solutions of film-forming polymers there are here especially to be understood those liquid lacquers which are suitable for use in printing inks for flexographic printing. As polymers, these solutions contain, for example, natural resins such as shellac or Manila copal, or cellulose derivatives, for example cellulose ethers, such as ethylcellulose or cellulose esters, such as nitrocellulose; also, maleate resins or phenol-formaldehyde resins which are preferably modified with colophonyl, such as the products described in U.S. Pat. No. 2,347,923; polyamide resins, that is to say polycondensation products of polyamines with polycarboxy compounds, which are described, for example, in U.S. Pat. No. 2,663,649; further, urea-formaldehyde and melamine-formaldehyde condensation products, ketone-formaldehyde condensation products, polyvinyl acetates or polyacrylic acid resins, for example polybutyl acrylate resin, or their mixtures.

In addition, the alcoholic solutions of film-forming polymers can also contain auxiliaries customary in the lacquer industry, such as wetting agents, for example higher fatty acid bis-hydroxyalkylamides, such as coconut oil fatty acid bis-(β-hydroxyethyl)-amide.

These alcoholic solutions of film-forming polymers containing dyestuff salts according to the invention are suitable, for example, for printing various materials such as metal foils, for example aluminium foils, paper, glass, synthetic resin sheets and films and the like. They are stable on storage and give water-resistant coatings on the materials mentioned.

Numerous ammonium salts of anionic dyestuffs are already known, but in no case is the dyestuff bonded to a primary amine group possessing a tert.alkyl radical with a total of 10 to 24 carbon atoms. It has been found that it is particularly these dyestuff salts which possess especially good solubility in alcohol.

The French Pat. No. 1,359,439, for example, describes ammonium salts of the 1:1 chromium complexes of azo dyestuffs and azomethine dyestuffs in which the amine nitrogen contains at least one aliphatic radical of which the carbon chain is interrupted by oxygen. The patent specifications which relate to ammonium salts of dyestuffs, wherein the primary amine group however does not contain a higher tert.alkyl radical, include, in particular, U.S. Pat. Nos. 2,095,077, 2,555,603, 2,628,960 and 2,937,165, German Pat. Nos. 703,546, 740,697, 743,848 and 890,251, French Pat. No. 1,199,654, British Patent Specification 994,979 and Japanese Pat. No. 12,915/66. The dyestuffs described in these patent specifications differ from those according to the invention in that the amine group is present in the secondary or tertiary form or that a primary or secondary alkyl radical or an aryl radical is bonded to a primary amine group. The dyestuff salts according to the invention can also be used as electrophotographic toners.

In the examples which follow, the percentages denote percentages by weight, unless otherwise stated.

EXAMPLE 1

33 g of the monoazo dyestuff obtained by coupling diazotised 2-aminobenzoic acid to 1-phenyl-3-methyl-5-pyrazolone are introduced, simultaneously with 14.7 g of chromium acetate (containing 19.5% of chromium), into 150 ccs. of formamide at 120°–130° C over the course of ½ an hour. The dyestuff dissolves as the chromium complex. The temperature is maintained at 120°–130° C until the chroming is completed, which requires 1½ – 2 hours. The formamide melt is now cooled to 80°–90° C and is then introduced into 1,000 ccs. of an aqueous solution of 11 g of Primene 81-R and 3 g of 85% strength formic acid. The metal complex dyestuff precipitates as a water-insoluble amine salt, initially in a slightly flocculent form. The mixture is stirred for 1 hour at room temperature, then warmed to 60° C, kept at 60° C for 2 hours and then filtered. The filter residue is thoroughly washed with 2,000 ccs. of water, containing a small amount of formic acid, at 40°–50° C, and is thoroughly suction-drained and dried at 80° C. The new dyestuff salt is a yellow powder which dissolves very readily in lower alcohols and ketones to give a yellow colour.

EXAMPLE 2

If instead of 11 g of Primene 81-R 16 g of Primene JM-T are used and the same procedure as indicated in Example 1 is followed, the Primene JM-T salt of the metal complex dyestuff is obtained, which possesses similar properties to the Primene 81-R salt, especially very good solubilities in lower alcohols and ketones.

EXAMPLE 3

88.9 g of the sodium salt of the 1:2 chromium complex of the monoazo dyestuff which was obtained by coupling diazotised 6-nitro-2-amino-4-tert.amylphenol to 1-phenyl-3-methyl-5-pyrazolone are dissolved in 200 ccs. of dimethylformamide at 70°–80° C and are then introduced dropwise into 1,500 ccs. of an aqueous solution of 23 g of Primene 81-R and 8 g of 85% strength formic acid. After briefly stirring the precipitate at room temperature, the reaction mixture is heated to 50°–60° C and kept at this temperature for approx. 4 hours. It is now filtered and the residue is washed with 2,000 ccs. of water at 40° C, which is slightly acidified with formic acid, and is thoroughly suction-drained and dried at 80° C. The new dyestuff salt is a red powder which possesses excellent solubilities in lower alcohols, ketones and aliphatic halogenated hydrocarbons.

EXAMPLE 4

If 34 g of Primene JM-T are used instead of 23 g of Primene 81-R in Example 3, whilst otherwise employing the same procedure, the Primene JM-T salt of the chromium complex dyestuff employed is obtained. It possesses similar properties to the Primene 1-R salt, especially very good solubility properties.

The table which follows lists further dyestuffs which are readily soluble in alcohol and which are obtained if, following the instructions of the preceding examples, the monoazo dyestuffs obtained by coupling the diazo compounds of the aminobenzenes mentioned in column 2 with the coupling components mentioned in column 3 are reacted with the acetate of the metal listed in column 1 to give the corresponding 1:2 metal complexes and the latter are converted into the salts with primene 81 or Primene JM-T. Column 4 shows the colour of the solution in ethanol.

| | 1 | 2 | 3 | 4 |
|---|---|---|---|---|
| No. | Metal | Diazo Component | Coupling Component | Colour of Solution in Ethanol |
| 5 | Cr | 2-Aminophenol-5-ethylsulphone | 1-Phenyl-3-methyl-pyrazolone-5 | red-orange |
| 6 | Cr | 5-Nitro-2-aminophenol-4-methylsulphone | 1-Phenyl-3-methyl-pyrazolone-5 | red |
| 7 | Cr* | 4-Nitro-2-amino-4-tert.amyl-phenol | 1-Phenyl-3-carboxy-pyrazolone-5 | blue-red |
| 8 | Co | 4-Nitro-2-amino-tert.amyl-phenol | 1-Phenyl-3-methyl-pyrazolone-5 | copper red |
| 9 | Cr mixed complex of: | 4-Nitro-2-amino-phenol | 0.5 mol of the dyestuff from: 1-Phenyl-3-methylpyrazolone-5 | brown |
| | | 4-Nitro-2-amino-phenol | 0.3 mol of the dyestuff from: 2-Naphthol | |
| | | 5-Nitro-2-amino-phenol | 0.2 mol of the dyestuff from: 2-Naphthol | |
| 10 | Cr | 2-Aminophenol | 2-Naphthol | violet |
| 11 | Cr | 4-Chloro-5-nitro-2-amino-phenol | 1-Hydroxynaphthalene-3,6-disulphonic acid methylamide | blue |

-continued

| No. | Metal | Diazo Component | Coupling Component | Colour of Solution in Ethanol |
|---|---|---|---|---|
| 12 | Cr** | 2-Aminohydroquinone-dimethylether | 1-Hydroxynaphthalene-3-sulphonic acid dimethylamide | blue |
| 13 | Co | 4-Nitro-2-amino-tert.amylphenol | 2-Naphthylamine | black |
| 14 | Cr mixed complex of: | 4-Nitro-2-aminophenol | 0.3 mol of the dyestuff from: 2-Naphthol | black |
|  |  | 5-Nitro-2-aminophenol | 0.4 mol of the dyestuff from: 2-Naphthol |  |
|  |  | 5-Chloro-2-aminophenol | 0.3 mol of the dyestuff from: 2-Naphthol |  |

*For this dyestuff, 3 mols of Primene must be employed per mol of Cr.
**This monoazo dyestuff must be chromed with simultaneous demethylation.

EXAMPLE 15

64.8 g of the azine dyestuff of the formula:

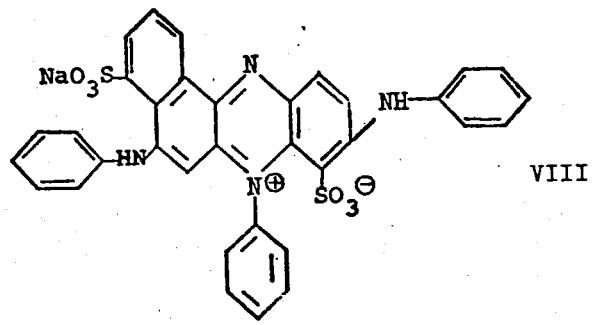

VIII are suspended in 1,700 ccs. of water at 80° C over the course of ½ hour. A solution of 32 g of Primene JM-T and 12 g of 85% strength formic acid in 300 ccs. of water is added dropwise to the suspension over the course of 1 hour at 40° C. The resulting amine salt of the dyestuff is initially present in a slightly jelly-like form. It is stirred for a further 5 to 6 hours at 40°–45° C; in the course thereof, the product assumes a well-crystallised form and can easily be separated from the practically colourless mother liquor by filtration. It is additionally washed with 2,000 ccs. of water containing a small amount of formic acid and is then dried. The product is a blue-black powder which dissolves very easily in lower alcohols and ketones to give a reddishtinged blue colour.

EXAMPLE 16

A product with very similar properties is obtained if instead of 32 g of Primene JM-T 22 g of Primene 81-R are used in Example 15, whilst otherwise following the same procedure.

If instead of the azine dyestuff used in Example 15 equimolecular amounts of one of the dyestuffs listed in the table below are employed and this dyestuff is reacted with Primene 81-R or Primene JM-T in accordance with the instructions of Example 15, salts which are readily soluble in alcohol and give a solution of the colour indicated in column 2 are obtained.

| No. | Dyestuff | Colour of Solution in Ethanol |
|---|---|---|
| 17 | 1-Amino-4-cyclohexylaminoanthraquinone-2-sulphonic acid | blue |
| 18 | 1-Amino-4-(3',4'-dimethylphenylamino)-anthraquinone-2-sulphonic acid | blue |
| 19 | [structure] | blue |
| 20 | Copper-phthalocyanine-3,4',4",4'''-tetrasulphonic acid | turquoise |
| 21 | [structure] | blue |

| No. | Dyestuff | Colour of Solution in Ethanol |
|---|---|---|
| 22 | HO₃S–C₆H₄–N=N–C₆H₂(OCH₃)(CH₃O)–N=N–C₆H₄–OCH₃ | orange |

If instead of the dyestuff obtained in Example 15 equimolar amounts of one of the monoazo dyestuffs listed in the table below, obtained by coupling the diazo compound of the aminobenzene mentioned in column 1 with the coupling component mentioned in column 2, are used and are reacted with Primene 81-R or Primene JM-T, salts which are readily soluble in alcohol and of which the solution has the colour indicated in column 3 are obtained.

| No. | 1 Diazo Component | 2 Coupling Component | 3 Colour of Solution in Ethanol |
|---|---|---|---|
| 23 | 2-Aminobenzenesulphonic acid | 1-Phenylpyrazolone-3-carboxylic acid methyl ester | yellow |
| 24 | 2-Aminobenzenesulphonic acid | 1-Phenyl-3-carboxypyrazolone-4'-sulphonic acid | yellow |
| 25 | 2-Nitroaniline-4-sulphonic acid | 1-Phenyl-3-methylpyrazolone | yellow |
| 26 | 2-Nitroaniline-4-sulphonic acid | 1-Phenyl-3-methylpyrazolone-4'-sulphonic acid | yellow |
| 27 | 4-Nitroaniline-2-sulphonic acid | N,N-Bis-cyanoethyl-aniline | orange |
| 28 | 2-Methoxy-4-nitroaniline-6-sulphonic acid | 2-Methylamino-8-naphthol-6-sulphonic acid | blue |

EXAMPLE 29

38.3 g of the monoazo dyestuff which is obtained by coupling diazotised 6-nitro-2-amino-4-methylphenol with 1-phenylpyrazolone-3-carboxylic acid, together with 15.2 g of chromium acetate (containing 20.5% of chromium), are introduced into 400 ccs. of formamide at 115° to 120° over the course of 1 hour. The dyestuff dissolves as the chromium complex. After 3 to 4 hours, the metallisation is complete. The formamide melt is cooled to 80°–90° and introduced over the course of 30 minutes into a solution of 35 g of Primene 81-R in 10 ccs. of 85% strength formic acid and 2,000 ccs. of water at room temperature. The mixture is stirred for 2 hours at room temperature and is then carefully heated to 35° and maintained at this temperature for approx. 14 hours. It is then filtered and the product is washed with 2,000 ccs. of water which has been rendered slightly acid to litmus with a little formic acid, washed, vigorously suction-drained and dried.

The resulting product, which is the Primene 81-R salt of the chromium complex employed, is a red powder which dissolves very readily in lower alcohols and ketones to give a bluish-tinged red colour. In particular, it is suitable for dyeing polystyrene.

EXAMPLE 30

If instead of 35 g of Primene 81-R 52 g of Primene JM-T are used and the same procedure as indicated in Example 1 is followed, the Primene JM-T salt of the chromium complex dyestuff employed is obtained. This salt has very similar properties to the Primene 81-R salt, especially very good solubility properties.

The table which follows lists further dyestuffs having very similar properties, which are obtained if, following the instructions of the preceding examples, the dyestuffs obtained by coupling the diazo compounds of the aminobenzenes mentioned in column 3 with the coupling components mentioned in column 4 are reacted with the acetate of the metal listed in column 1 to give the corresponding 1:2-metal complexes and the latter are converted into the corresponding salts with Primene 81-R or Primene JM-T. Column 5 indicates the colour of the solution in ethanol.

Table I

| Example No. | Metal | Diazo Component | Coupling Component | Colour of Solution in Alcohol |
|---|---|---|---|---|
| 31 | Co | 2-Amino-4-methylphenol-6-carboxylic acid | 1-Phenyl-3-methyl-5-pyrazolone | yellow |
| 32 | Cr | 2-Amino-4-methylphenol-6-carboxylic acid | 1-Phenyl-3-methyl-5-pyrazolone | red |
| 33 | Co | 2-Aminophenol-4-methylsulphone | 2,3-Hydroxynaphthoic acid | claret |
| 34 | Co | 6-Nitro-2-aminophenol-4-methylsulphone | 2,3-Aminonaphthoic acid | green |
| 35 | Cr | 6-Nitro-2-amino-4-tert.amylphenol | 2,3-Hydroxynaphthoic acid | black |

EXAMPLE 36

50 g of the 1:1 chromium complex of the monoazo dyestuff obtained by coupling diazotised 1-amino-2-naphthol-4-sulphonic acid with 1-phenyl-3-methyl-5-pyrazolone are dissolved in 600 ccs. of water at 50°, containing 11 g of calcined sodium carbonate and the mixture is added dropwise over the course of 1 hour to a solution of 42 g of Primene 81-R in 16 g of 85% strength formic acid and 2,000 ccs. of water at 60°.

Hereupon, the metal complex dyestuff precipitates as the Primene 81-R salt. The mixture is kept at 60° for 4 hours and is then filtered, and the product is washed with 2,000 ccs. of water at 40° to 50° which has been slightly acidified with a little formic acid and is thoroughly suctiondrained and dried at 80°. The resulting Primene 81-R salt of the chromium complex dyestuff employed is a red powder which is very readily soluble in lower alcohols and ketones. It is also very suitable for colouring polystyrene.

EXAMPLE 37

84.1 g of the chromium complex dyestuff of the formula

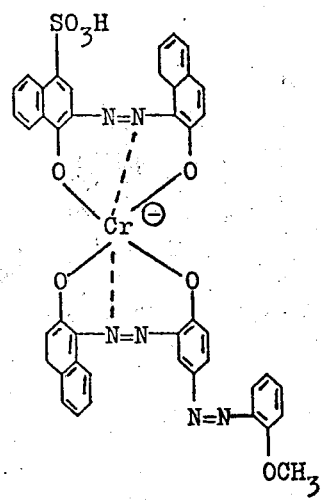

IX are suspended in 3,000 ccs. of water at 80° for 2 hours. Thereafter the temperature is allowed to drop to 40° and a solution of 44 g of Primene 81-R in 16 g of 85% strength formic acid and 1,000 ccs. of water is then added dropwise over the course of 1 hour. The reaction mixture is kept at 40° for 14 to 16 hours whilst stirring vigorously and is then filtered. The mother liquors are pale brown in colour. The filter residue is washed with 3,000 ccs. of water which is slightly acidified with a little formic acid and is thoroughly suction-drained and dried at 70°. The new dyestuff salt is a black powder which is very readily soluble in lower alcohols and ketones and in aliphatic halogenated hydrocarbons. It is suitable for colouring polystyrene, wherein it gives deep black colourations.

EXAMPLE 38

If, following the instructions of Example 37, 67 g of Primene JM-T are used instead of 44 g of Primene 81-R whilst otherwise employing the same procedure, the Primene JM-T salt of the chromium complex dyestuff employed is obtained. This has very similar properties to the Primene 81-R salt of Example 37, especially very good solubility properties. It is very suitable for colouring polystyrene. Primene salts of very similar properties are obtained if, following the instructions of Examples 37 and 38, equimolar amounts of the mixed chromium complexes of the monoazo dyestuffs of column I with those of column II are used.

EXAMPLE 42

20 g of the dyestuff salt obtainable according to Example 1, 30 g of bleached wax-free shellac, 5 g of dibutyl phthalate and 45 g of ethanol are mixed.

A printing ink of good storage stability is thus obtained, which can be used as such, or diluted with ethanol, for flexographic printing on paper sheets and aluminium foils. This printing ink gives yellow, full, lightfast prints, which adhere well, on the materials mentioned.

EXAMPLE 43

10 g of the dyestuff salt obtainable according to Example 1 are stirred into 90 g of a solution consisting of

TABLE II

| Example No. | Azo Dyestuff I | Azo Dyestuff II | Colour of Solution in Alcohol |
|---|---|---|---|
| 39 | [naphthalene-SO₃H linked N=N to naphthol-OH] | [phenyl-SO₂NH₂ linked N=N to dichloronaphthol] | navy blue |
| 40 | [O₂N-naphthalene(SO₃H)(OH) linked N=N to naphthol-OH] | [NO₂-phenyl linked N=N to OH-naphthalene-NH-CO-CH₃] | black |

TABLE II-continued

| Example No. | Azo Dyestuff I | Azo Dyestuff II | Colour of Solution in Alcohol |
|---|---|---|---|
| 41 | (naphthalene with OH, N=N, O$_2$N, SO$_3$H substituents) | (benzene-SO$_2$NH, OH, N=N, naphthalene-HO, Cl, Cl) | black |

25% of a spirit-soluble ester-modified polyamide resin, for example manufactured according to Example 7 of U.S. Pat. No. 2,663,649, 2% of water, 5% of benzine, 80°–100° C fraction, 48% of ethanol and 20% of isopropanol.

A printing ink is obtained, which when printed flexographically colours cellophane in a yellow colour shade possessing good adhesion and good fastness to light.

EXAMPLE 44

2.6 g of the dyestuff salt according to Example 3 are sprinkled onto 1,000 g of a solution of acetylcellulose in acetone, having a solids content of 26%. 20 ml of acetone are then added and the mixture is tumbled in a well-closed bottle on a roller stand until the dyestuff has completely dissolved. Thereafter the dyed spinning solution is extruded through nozzles. The filament formed passes through a fairly long heated tube and can then be wound up immediately. The dyed material shows a red colour shade and possesses excellent fastness properties, in particular perfect fastness to washing, water, overdyeing, dry cleaning, rubbing, ironing and light.

EXAMPLE 45

100 g of a polystyrene powder or of polystyrene granules are mixed dry with 4 parts of the dyestuff salt obtained according to Example 37, in a mixing apparatus. The resulting mixture is melted in a cylinder and extruded. The extruded profiles are comminuted.

100 g of the coloured polystyrene obtained according to paragraph 1 are ground in a ball mill and sieved so that a fine powder of 15 to 20$\mu$ average particle size, possessing a negative charge, is obtained. This powder is intimately mixed, in the ratio of 3:100, with iron powder of 100 to 150$\mu$ diameter.

Zinc oxide paper is negatively charged with 6,000 volt, and is then selectively illuminated and sprinkled with a powder obtained according to paragraph 2, whereupon the latter continues to adhere in the exposed areas and a negative image is produced. On heating the paper, the powder melts and becomes fixed.

I claim:

1. A dyestuff salt of the formula

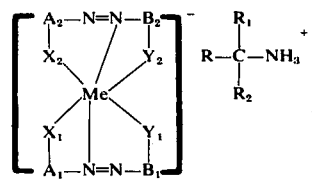

wherein $A_1$ and $A_2$ each denote a benzene radical which contains $X_1$ or $X_2$ in the position adjacent to the azo bond, $B_1$ and $B_2$ each denote a benzene, naphthalene, pyrazolone or acetoacetylarylamide radical which contains $Y_1$ or $Y_2$ in the position adjacent to the azo bond, with $X_1$ or $X_2$ denoting —O— or —COO— and $Y_1$ and $Y_2$ each denotes —O—, —N—$R_7$, wherein $R_7$ represents hydrogen, alkyl or aryl, Me denotes chromium or cobalt, and R, $R_1$ and $R_7$ have the meaning indicated in claim 1.

2. A dyestuff salt according to claim 1 of the formula

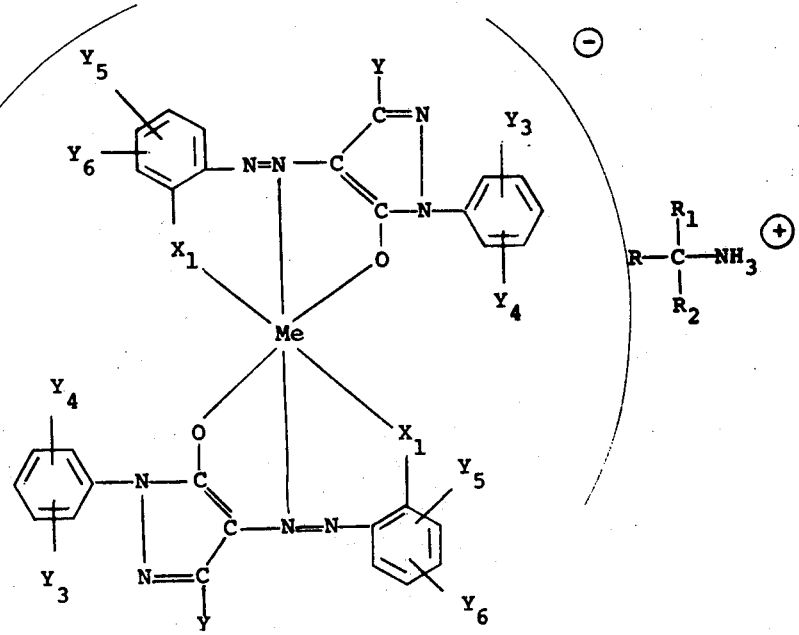

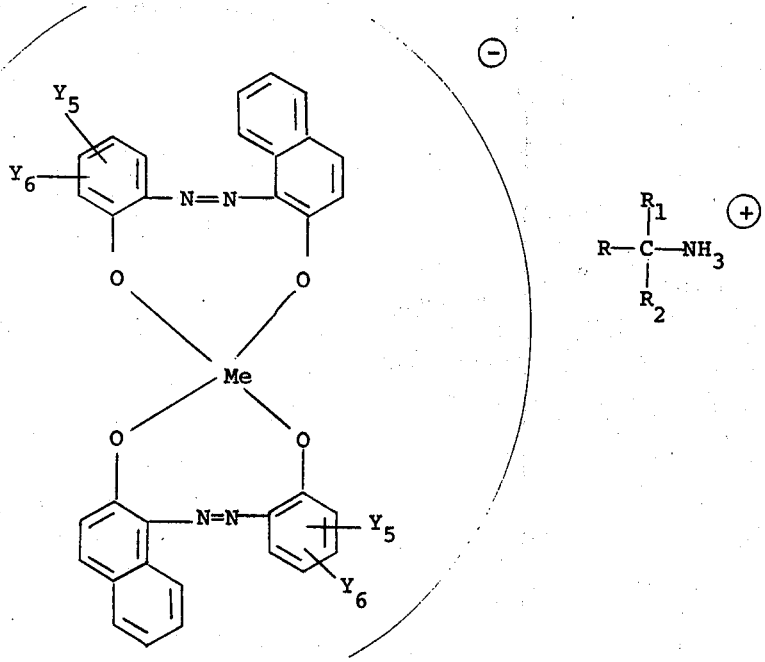

or wherein $X^\ominus$ denotes —O— or —COO—, Y denotes methyl or alkoxycarbonyl containing 1–6 carbon atoms, $Y_2$ denotes hydrogen, chloro, alkyl containing 1–6 carbon atoms or alkoxy containing 1–6 carbon atoms, $Y_6$ denotes hydrogen, nitro or alkylsulphonyl containing 1–6 carbon atoms, $Y_3$ and $Y_4$ denote hydrogen, chloro or alkyl containing 1–6 carbon atoms and R, $R_1$ and $R_2$ is alkyl containing 10–24 carbon atoms; and Me denotes chromium of cobalt.

3. A dyestuff salt according to claim 2, of the formula

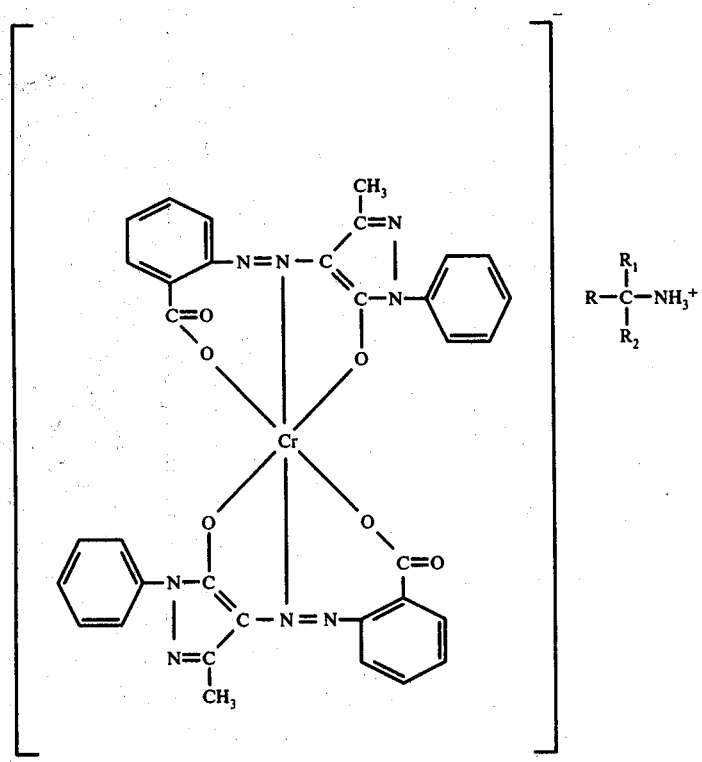

4. A dyestuff salt according to claim 2 of the formula
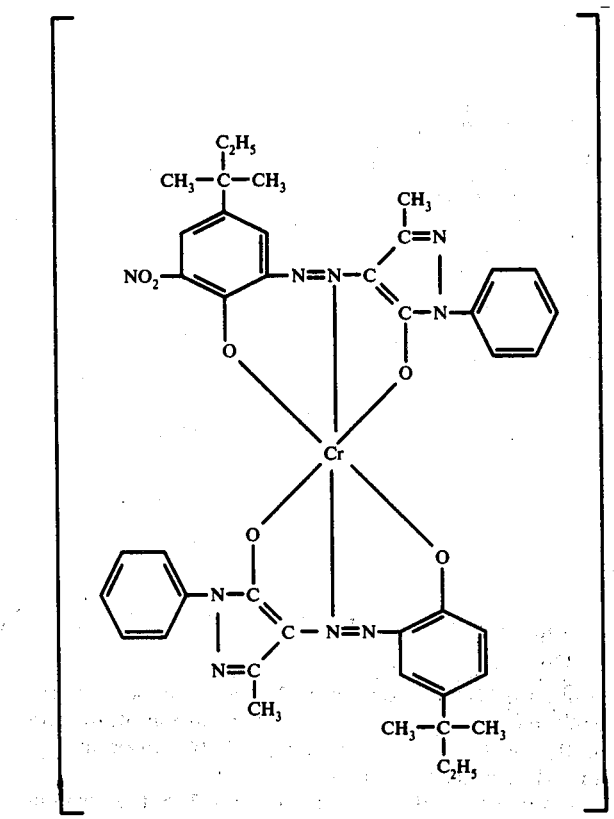 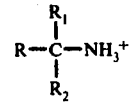
5. A dyestuff salt according to claim 2 of the formula
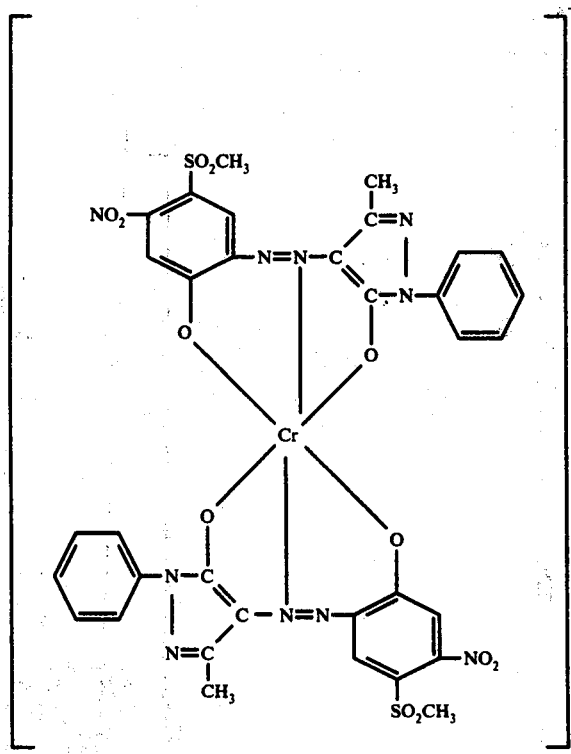 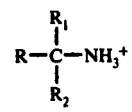
* * * * *

UNITED STATES PATENT AND TRADEMARK OFFICE
CERTIFICATE OF CORRECTION

PATENT NO. : 3,994,872
DATED : November 30, 1976
INVENTOR(S) : Werner Kuster

It is certified that error appears in the above—identified patent and that said Letters Patent is hereby corrected as shown below:

Claim 1, column 16, line 45, "$R, R_1$ and $R_7$ have the meaning indicated in claim 1", should be replaced by -- $R, R_1$ and $R_2$ are alkyl containing 10-24 carbon atoms --.

Signed and Sealed this

Eighth Day of September 1981

[SEAL]

Attest:

GERALD J. MOSSINGHOFF

Attesting Officer     Commissioner of Patents and Trademarks